(12) United States Patent
Suprun et al.

(10) Patent No.: US 7,292,223 B2
(45) Date of Patent: *Nov. 6, 2007

(54) LOCATION TRACKING DEVICE

(75) Inventors: Anton E. Suprun, Novosibirsk (RU); Dmitri V. Simonenko, Potomac Falls, VA (US)

(73) Assignee: Innalabs Technologies, Inc., Dulles, VA (US)

( * ) Notice: Subject to any disclaimer, the term of this patent is extended or adjusted under 35 U.S.C. 154(b) by 689 days.

This patent is subject to a terminal disclaimer.

(21) Appl. No.: 10/836,624

(22) Filed: May 3, 2004

(65) Prior Publication Data

US 2005/0001814 A1    Jan. 6, 2005

Related U.S. Application Data

(63) Continuation-in-part of application No. 10/442,170, filed on May 21, 2003, now Pat. No. 7,061,469, which is a continuation-in-part of application No. 10/209,197, filed on Aug. 1, 2002, now Pat. No. 6,731,268, which is a continuation of application No. 09/511,831, filed on Feb. 24, 2000, now Pat. No. 6,466,200.

(51) Int. Cl.
*G09G 5/00* (2006.01)
*G01C 21/00* (2006.01)

(52) U.S. Cl. .............. 345/156; 701/213; 701/215; 701/216; 342/357.06; 342/357.08; 342/357.12; 73/514.08

(58) Field of Classification Search ........ 345/156–169; 273/148 B; 463/37–38; 348/734; 73/514.01–514.08, 73/514.31; 701/79, 110, 213–216; 342/357.06, 342/357.07, 357.08, 357.12, 357.14
See application file for complete search history.

(56) References Cited

U.S. PATENT DOCUMENTS

| | | | |
|---|---|---|---|
| 4,601,206 A | | 7/1986 | Watson |
| 4,984,463 A | | 1/1991 | Idogaki et al. |
| 5,181,181 A | | 1/1993 | Glynn |
| 5,774,113 A | | 6/1998 | Barnes |
| 5,831,553 A | | 11/1998 | Lenssen et al. |
| 5,835,077 A | | 11/1998 | Dao et al. |
| 5,856,802 A | * | 1/1999 | Ura et al. .............. 342/357.08 |

(Continued)

FOREIGN PATENT DOCUMENTS

DE    3315958 A1    1/1984

(Continued)

OTHER PUBLICATIONS

English Translation Abstract to RU 2201618 C2 (AL1).

(Continued)

*Primary Examiner*—Lun-Yi Lao
(74) *Attorney, Agent, or Firm*—Bardmesser Law Group

(57) ABSTRACT

A location tracking device utilizing an acceleration sensor is described. The acceleration sensor includes an inertial body in magnetic fluid that is contained in a closed volume vessel. The tracking device may be used for tracking objects, people, animals, and the like. The tracking device may be utilized as a back-up system to a GPS system such that when signal from a GPS receiver are unavailable, the location tracking device may provide positional information about the location of the object.

19 Claims, 3 Drawing Sheets

U.S. PATENT DOCUMENTS

| | | | |
|---|---|---|---|
| 5,905,460 A * | 5/1999 | Odagiri et al. | 342/357.06 |
| 5,982,169 A | 11/1999 | Furlani et al. | |
| 6,002,184 A | 12/1999 | Delson et al. | |
| 6,128,006 A | 10/2000 | Rosenberg et al. | |
| 6,154,199 A | 11/2000 | Butler | |
| 6,160,540 A * | 12/2000 | Fishkin et al. | 345/184 |
| 6,369,794 B1 | 4/2002 | Sakurai et al. | |
| 6,466,200 B1 | 10/2002 | Anton et al. | |
| 6,501,458 B2 | 12/2002 | Baker et al. | |
| 6,509,888 B1 | 1/2003 | Tuovinen et al. | |
| 6,731,268 B2 * | 5/2004 | Anton et al. | 345/163 |
| 6,820,002 B2 * | 11/2004 | Terada | 701/207 |
| 6,924,764 B1 * | 8/2005 | Chen | 342/357.07 |
| 6,985,134 B2 * | 1/2006 | Suprun et al. | 345/163 |
| 7,061,469 B2 * | 6/2006 | Suprun et al. | 345/158 |
| 2002/0003527 A1 | 1/2002 | Baker et al. | |
| 2002/0054011 A1 | 5/2002 | Bruneau et al. | |
| 2004/0095317 A1 | 5/2004 | Zhang et al. | |
| 2004/0140962 A1 | 7/2004 | Wang et al. | 345/179 |

FOREIGN PATENT DOCUMENTS

| | | |
|---|---|---|
| JP | 62-163972 | 7/1987 |
| JP | 02-205775 | 8/1990 |
| JP | 04-344467 | 12/1992 |
| JP | 06-3444467 | 12/1992 |
| JP | 06-213921 | 8/1994 |
| RU | 2168201 C1 | 11/1999 |
| RU | 2166203 C1 | 1/2000 |
| RU | 2173882 C1 | 3/2000 |
| RU | 2201618 C2 | 3/2001 |

OTHER PUBLICATIONS

English Translation Abstract to RU 2173882 C1 (AM1).

English Translation Abstract to RU 2166203 C1 (AN1).

English Translation Abstract to RU 2168201 C1 (AO1).

"IEEE Recommended Practice for Precision Centrifuge Testing of Linear Accelerometers", IEEE Standards 836-2001, The Institute of Electrical and Electronics Engineers, Inc., Nov. 7, 2001, pp. i-86.

"IEEE Specification Format Guide and Test Procedure for Two-Degree-of-Freedom Dynamically Tuned Gyros", ANS/IEEE Std 813-1988, The Institute of Electrical and Electronic Engineers, Inc., 1989, pp. i-91.

Bashtovoi, V.G. et al. "Introduction to Thermomechanics of Magnetic Liquids", High Temperature Institute of the Academy of Sciences of the USSR, Moscow, 1985 (partial translation of p. 13).

"IEEE Standard Specification Format Guide and Test Procedure for Nongyroscopic Inertial Angular Sensors: Jerk, Acceleration, Velocity, and Displacement", IEEE Std 671-1985 (R2003), The Institute of Electrical and Electronics Engineers, Inc., 1985, pp. iii-69.

English Translation Abstract for DE 3315958 A1, 1 page, supplied from the esp@cenet database.

*Notification Of Transmittal Of The International Search Report And The Written Opinion Of The International Searching Authority, Or The Declaration*, from PCT Application No. PCT/US04/15924, 8 pages, mailed Dec. 9, 2004.

Computer Internet Website, Magellan 3D Controller (also known as Space Mouse), by Logicad, a Logitech Company, address "http://www.qualixdirect.com/html/magellan.html", 2 pages.

Computer Internet Website, "Logitech 3D Mouse Logitech Head Tracker", by Fakespace, Inc., address "http://www.qualixdirect.com/html3d_mouse_and_head_tracker.html", 2 pages.

Computer Internet Website, "The Spaceball 3D Controller", by Spacetec IMC Corporation, address "http://www.qualixdirect.com/html/spaceball.html", 3 pages.

* cited by examiner

LOCATION TRACKING DEVICE

CROSS-REFERENCE TO RELATED APPLICATIONS

This application is a continuation-in-part of U.S. patent application Ser. No. 10/442,170, filed May 21, 2003 which is a continuation-in-part of U.S. patent application Ser. No. 10/209,197, filed Aug. 1, 2002 which is a continuation of U.S. patent application Ser. No. 09/511,831, Feb. 24, 2000 now U.S. Pat. No. 6,466,200, which in turn claims priority to Russian patent application No. 99122838, filed Nov. 3, 1999, each of which are incorporated by reference herein in their entireties.

FIELD OF THE INVENTION

The invention is directed to using an acceleration sensor as part of a location tracking device for providing positional information about the objects movement and location.

SUMMARY OF THE INVENTION

Accordingly, the invention may include a location tracking device which may include an acceleration sensor that preferably includes a closed volume vessel containing magnetic fluid, a non-magnetic inertial body contained in the vessel, and at least three magnetic field sources located in pairs on three mutually perpendicular axes around the closed volume vessel. In preferred embodiments, the at least three magnetic field sources have an output connected to inputs for the signal converter module. The invention may include a location positioning device, where the outputs of the signal converter module are connected to inputs of the location positioning device.

The invention may also include a location tracking device which may include a GPS apparatus and an acceleration sensor, where the acceleration sensor may include a closed volume vessel containing magnetic fluid, a non-magnetic inertial body contained in the vessel, and at least three magnetic field sources located in pairs on three mutually perpendicular axes around the closed volume vessel. The at least three magnetic field sources have an output connected to an input of a signal converter module. The device may include a location positioning device and a switch in communication with the GPS apparatus, the signal converter module, and the location positioning device, where the switch provides GPS positional information to the location positioning device and monitors GPS signals from the GPS apparatus and based on an interruption of the GPS signal, provides positional information from the signal converter module to the location positioning device.

DETAILED DESCRIPTION OF THE INVENTION

In accordance with an embodiment of the invention, a location tracking device is provided with an acceleration sensor that allows for three dimensional manipulation and detection of movement in as many as six degrees of freedom. The acceleration sensor provides increase reliability and manufacturability and provides the capability of gradual sensitivity adjustments. As will be discussed below, the location tracking device and system may be used for tracking various assets, such as inventory items, personnel, equipment, and other items where the location of the item is important to know.

Figure 1:
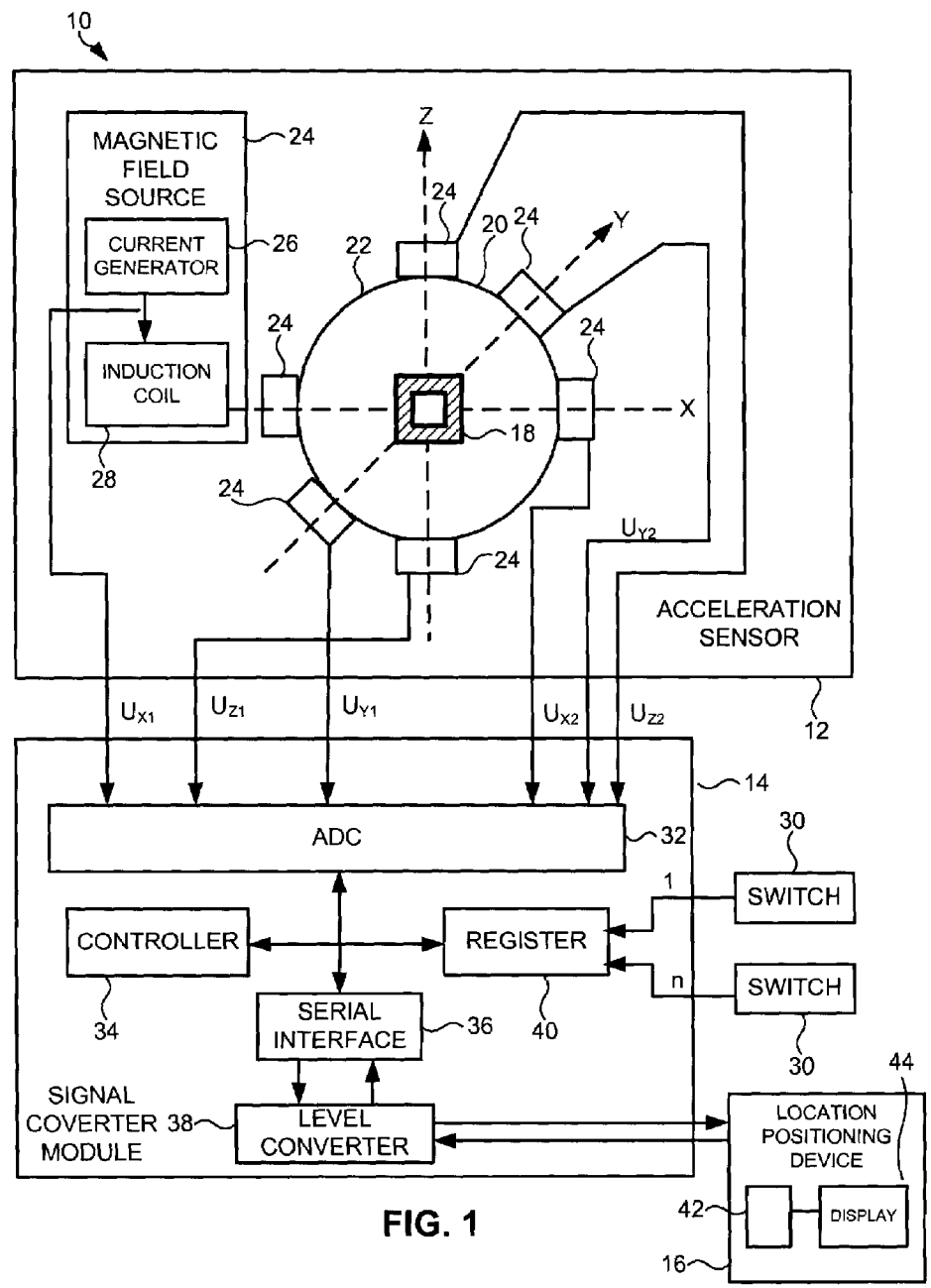
FIG. 1 is a diagrammatic view of a location positioning device in accordance with an embodiment of the invention.

Various embodiments of the location tracking device and system utilize an acceleration sensor, With reference now to FIG. 1, there is shown a location tracking device 10 in accordance with an embodiment of the present invention. Generally, the location tracking device 10 includes an acceleration sensor 12, a signal converter module 14, and a location positioning device 16. Briefly, with the acceleration sensor 12 fixed to a object, the acceleration sensor 12 detects the movement of the object and sends signals through the signal converter module 14 to the location position device 16 where the location of the object is determined.

The acceleration sensor includes a symmetric inertial body 18 made of non-magnetic material positioned in a closed volume vessel 20 containing magnetic fluid 22. In certain embodiments, three pairs of magnetic field sources, each represented by the reference numeral 24, are located around the closed volume vessel 20 on mutually perpendicular axes.

The inertial body 18 includes a symmetrical shape, such as a sphere or a centrally symmetrical polygon, and is made of non-magnetic material such as plastic or Plexiglas. The inertial body 18 is surrounded by the magnetic fluid 22 in the closed volume vessel 20. The shape of the inertial body is not particularly limited and may include a spherical or a centrally symmetrical polygon. Further, the inertial body may be relatively solid or hollow. The inertial body may consist of two or more non-magnetic materials. In some embodiments, the inertial body may have a density close to that of the selected magnetic fluid.

The closed volume vessel 20 holds the magnetic fluid 22 and symmetric inertial body 18 within the interior space of the closed volume vessel. The shape of the closed volume vessel is not particularly limited and can take on a variety of shapes, such as spherical or a centrally symmetrical polygon. In some embodiments, it is preferable to that the closed volume vessel 20 be centrally symmetric.

The magnetic fluid 22 is contained within the closed volume vessel 20. The acceleration sensor is based on the properties of the magnetic fluid. Expulsive forces are developed around a non-magnetic body immersed in magnetic fluid. The potential and distribution of the magnetic field lines in the magnetic fluid determine the direction and magnitude of such expulsive force. (S. V. Rulev, V. N. Samsonov, A. M. Savostianov, G. K. Shmyrin, "Controlled Vibroinsulators with Magnetic Fluid", MO USSR, M., 1988, pages 17-21, herein incorporated by reference in its entirety).

Therefore, the magnetic fluid should be viewed relative to the body made of the non-magnetic material as an environment which the effective density is increased proportionately to the increase of the magnetic field force.

In some embodiments, the magnetic fluid may be a two-phase system that possesses both flowability and high sensitivity to an applied magnetic field. The particle size of the solid phase of the mixture in one embodiment may be about $1\times10^{-9}$ meters. One type of suitable magnetic fluid is a low viscosity dispersion of magnetite or loadstone in kerosene, having a density ranging from about 1.1 to about 1.5 grams/cubic centimeter. The kerosene dispersion has an effective viscosity ranging from about 0.005 and about 0.1 PAs and has magnetizability under a 250 kA/m magnetic field between about 30 and about 50 kA/m.

Another suitable magnetic fluid may include a low viscosity dispersion of magnetite in liquid organic silicone having a density ranging from about 1.1 and about 1.5 grams/cubic centimeter. The silicon dispersion has an effective viscosity below about 0.7 PAs and has a magnetizability under a 250 kA/m magnetic field of about 25 kA/m. Further, a magnetoreactic suspension of dispersed ferromagnetic matter in liquid organic silicone may serve as a suitable magnetic fluid. The magnetoreactic suspension has a density ranging from about 3.4 to about 4.0 grams/cubic centimeters, a friction of factor of about 0.1 to about 0.2, and a wear rate ranging from about $2 \times 10^{-7}$ to about $8 \times 10^{-7}$.

With continuing reference to FIG. 1, the magnetic field sources 24 are located around the closed volume vessel 20. In some embodiments three pairs of magnetic field sources 24 are spaced around the closed volume vessel 20 on mutually perpendicular axes (note that only five of the six sources are shown in the figure). The magnetic filed sources 24 include a current generator 26 and one or more induction (magnetic) coils 28, where the current generator 26 may be serially connected to the induction coils 28. In some embodiments one current generator 26 is used for all induction coils 28 or alternatively, each induction coil 28 or pair of induction coils may have their own current generator 26. In order to simplify the device's manufacturing, additional sources of the magnetic field may consists of several interconnected coils. In order to reduce power consumption, one or more constant magnets may be added to the source of magnetic field. Further, several additional magnetic field sources may be introduced in the device. The outputs from these additional sources may be optionally connected.

A signal converter module assembly 14 and optional switches 30 are provided where the magnetic field source 24 is connected to current generator 26 and induction coil 28, and where the current generator is connected to the magnetic field source 24. The signal converter assembly 14 may contain a six-channel analog to digital converter ADC 32, a controller 34, a serial interface 36, a level converter 38 and an input register 40, where the input register inputs are digital inputs of the signal converter module 14 and analog inputs of the signal converter module 14 are inputs of the ADC 32. In some embodiments, the ADC output is connected through bi-directional bus with the controller 34, input register 40 and serial interface 36, the input and output of which are correspondingly connected to the output and input of the level converter 38. In some embodiments, the output and input of the level converter is the device output and inputs. The outputs for the acceleration sensor 12 are connected to the analog inputs of the signal converter module 14, and the digital inputs are connected to optionally provided switches 30, where one of the switches may be employed as an indicator of the operator activity and remaining switches are used by the operator to control software on a computer.

Analog outputs of the signal converter module 14, which are outputs of a six channel ADC 32, are connected to the control terminals of the magnetic field sources 24, which are inputs of the current generator 26. Digital inputs to the ADC 32 are connected by a bi-directional bus with the controller 34.

The induction (magnetic) coil(s) 28 may be connected to a parallel resonance circuit in order to register changes in the coil's Q-factor, to be discussed below. Various designs of adjustable voltage current generators for the current generator 26 on transistors or operational amplifier IC are described in P. Horovitz, W. Hill "*The Art of Circuit Engineering*", 3 volumes, published in Moscow by Mir in 1993, herein incorporated by reference in its entirety.

The signal converter module 14 may be based on a MC68HC05B6 chip or other similar chip, with serial input and output connected correspondingly to the output and input of the level converter 38, which can be designed around an ADM203 chip. The MC68HC05B6 is an 8-bit single chip microcontroller that contains HCO5 microprocessor core, 6 Kbyte ROM, 176 byte RAM, 8-channel, 8-bit ADC with built-in reference voltage generator, multipurpose timer, clock generator which requires external quartz resonator and passive filter, and RS-232 serial interface. The serial interface is an example but could be any communication method that permits processor to processor communication, Connection diagram and detailed description of this microcontroller can be found in "MC68HC05B6 Technical Data" Rev. 3 1995.

An AD7228A chip may be used as a 6-channel ADC in signal the converter module 14. The AD7228A has a built-in reference voltage generator, and requires single +5V power source. To create additional analog inputs in the signal converter assembly, one or more AD 7828 chips may be employed as an 8 channel, 8-bit ADC. They require a +5V power source and a filtered +5V power source may be used as reference voltage. Technical specifications of AD7228A and AD 7828 may be found in 1996 *Short Form Designer Guide*, Analog Devices, 1996 herein incorporated by reference in its entirety.

The ADM203 chip has two channels of logical signal converter with 0 and +5V levels in RS-232 signals ands two converter channels from RS-232 into 0 and +5V logical signals. No passive elements are required. Technical specifications and connection diagrams of ADM203 chip may be found in *ADM2XXL Family for RS-232 Communications*, Rev. 0, 1994 and is here in incorporated by reference in its entirety.

To provide for gradual sensitivity adjustment by computer software, a DAC may be added to the signal converter module 14. In this configuration, the DAC output would be connected to the analog output of the signal converter module 14, which connects to control inputs of the magnetic field sources 24. The DAC may be connected by a bi-directional bus to the controller 34. The control input of the magnetic field sources 24 is the control input for the current generator 26.

The location positioning device 16 receives signals generated from the acceleration sensor 12 and signal converter module 14 and uses the signals to determine the location of the object. Location positioning device 16 may include a computer 42 with associated software or programming that use the signals from the acceleration sensor 12 and signal converter module 14 to track the location of the object. In some embodiments the location positioning device 16 includes reference location information, such as a map or other similar reference information. The location positioning device 16 may use the signals generated from the acceleration sensor 12 and signal converter module 14 to compare the movement of the object with the reference location information to determine the location of the object. The location positioning device 16 may include a display 44 that displays the location of the object and may also display the reference location information.

The general operation of a location tracking device in accordance with an embodiment of the invention will now be described.

Due to the radial gradient of the magnetic field force, the effective density of the magnetic fluid increases in the direction from the center of the acceleration center. Therefore, the inertial body is being pushed toward the equilibrium point that is close to the geometric center of the acceleration sensor.

After the acceleration sensor is moved, the inertial body, being in transitional state, is moved away from the equilibrium center, which in turn leads to the change in thickness of magnetic fluid located underneath each coil.

The alternating magnetic field of each coil interacts with a volume part of magnetic fluid adjacent to it; where this volume fraction is determined by the distribution of the magnetic field lines, and the depth of the volume fraction is determined by the inertial body position.

The quantity and properties of the magnetic fluid in the fraction of the volume directly relates to and determines the amount of energy needed for flux reversal magnetization of the magnetic fluid.

The Q-factor of the coil can now be measured by the amount of energy spent on alternating the magnetic field, which depends on the amount of magnetic fluid in the affected volume fraction, which in turn depends on the position of the inertial body in the sealed container. The inertial body is displaced due to acceleration caused by movement of the acceleration sensor. As displacement occurs, the Q-factor of each coil changes as the inertial body moves away from the equilibrium point.

Additionally, the image impedance of the electric magnet (each coil) will change accordingly. The impedance change leads to a change of voltage on the electrical magnets (coils), where amplitudes of the potential will change in antiphase on the coils on which the axis force is applied to the acceleration sensor. After the movement of the sensor, the differential of the current (amplitude) variable component increases in each couple of coils and is proportional to the acceleration applied to the corresponding axis. It is the possible to describe the movement of the sensor along any space trajectory.

When the sensor is being rotated along the axis, the magnetic fluid acts as an inertial body, which moves in the magnetic field. The magnetic field is inhomogeneous in the direction of the rotation. Acceleration in the flow of the magnetic fluid resulting from the rotation leads to a change in impedance in the electric coils for these coils along which the magnetic fluid is moving. Such change in impedance, which results from a loss of magnetic field energy to reversal magnetization of moving magnetic fluid, leads to in-phase change coils voltage. The magnitude of the voltage change is proportionate to angular acceleration of the acceleration sensor. Therefore, the magnitude of the voltage change is used to describe the axial rotation of the acceleration sensor at any axis.

The device of the present invention provides for independent sensing of movement along three spatial and three angular degrees of freedom. The device output signal contains information about six independent degrees of freedom.

Reliability of the device is increased by the absence of the contacting mechanical parts and ease of manufacture is increased by the absence of the requirements for precision machining of the acceleration sensor parts. Many of the parts may be manufactured by injection molding from plastic. Electrical magnets may be manufactured by the printed circuit technology in order to eliminate need for coiled parts to further simplify the device manufacturing.

Sensitivity adjustment of the input device may be achieved by changing the medial potential of the magnetic field in the magnetic fluid. A change in the magnetic field can be either due a to change of current in the coils or a change in proximity of the magnetic field sources from the surface of the acceleration sensor.

The proposed input device may be used for input of coordinate information, graphical information and controlling computer generated objects, which may be valuable in such computer applications as computer games and 3-dimensional designs, etc., and as a substitute for a mouse, keyboard or the like.

With reference to FIG. 1, the following symbols are used: The following symbols are used: $U_{x1}$, $U_{x2}$—voltages on the acceleration sensor output that corresponds to the X axis; $U_{y1}$, $U_{y2}$—voltages on the acceleration sensor output that corresponds to the Y axis; $U_{z1}$, $U_{z2}$—voltages on the acceleration sensor output that corresponds to the Z axis.

While the device is not in motion, the non-magnetic inertial body 18 is located near the center of the magnetic fluid filled vessel 20 of the acceleration sensor 12. This position of the inertial body creates a magnetic field in the magnetic fluid 22. The intensity of the magnetic field increases away from the center of the vessel of the acceleration sensor 12, which ensures positive gradient of effective density of the magnetic fluid 22 that is also directed away from the sensor center. Therefore the inertial body 18, not being influenced by the magnetic field, is displaced to the point of lowest effective density of the magnetic fluid 22, to the proximity of the geometrical center of the magnetic fluid 22 filled volume of the acceleration sensor 12.

A symmetric (e.g. sphere) shaped inertial body that is enclosed in magnetic fluid filled volume ensures approximate equal thickness of the magnetic fluid between the inertial body and the magnetic field sources 24. The magnetic field source consists of the current generator 26 and coil 28. In order to register coils Q-factors, the current generator 26 output contains an alternating current (AC) component. The amplitude of the alternating component for each generator is less than the DC component agents, generator output may entirely consists of (in the design version with constant in alternating component to reduce power consumption). The amplitudes of alternating component for each current generator 26 are approximately equal.

Thickness of the magnetic fluid layer is nearly equal relative to each of the magnetic coils 28 on the X and Y axis which ensures fairly good uniformity of Q-factors on all the coils 28. Therefore, alternating current voltages in the static state of the device are approximately equal on the acceleration sensor 12 outputs responsible for the X and Y-axis. As will be seen in the formulas below, since actual values of "static" voltages on corresponding coils are used, then the difference in Q-factor values resulting from mechanical imperfections or mal-adjustments in the sensors may be ignored, as they do not affect accuracy. Therefore a differences in Q-factor of the coils on the Z-axis due to offset of the inertial body 18 on this axis do not result in inexact acceleration measurement on the Z-axis.

Acceleration sensor sensitivity adjustments are achieved by changing the medial level of magnetic field in the magnetic fluid. The change can be made by changing the DC component magnitude on the current generator or by decreasing/increasing the magnetic source proximity from the center of the accelerator sensor.

A change in the DC component may be controlled by a computer through the input of the device by changing the voltage on the DAC output and therefore controlling the current generator. There are two ways to adjust the accelerator sensor. First, the acceleration sensor may be adjusted independently from the computer software by changing the proximity of the magnetic field sources relative to the center of the acceleration sensor or by manually changing the DC component of the current generators. Second, the acceleration sensor may be adjusted by computer commands that change the voltage on the analog outputs of the signal converter.

The inertial mass damping coefficient of the magnetic fluid changes as a result of moving away from an equilibrium state. The damping coefficient determines the amplitude (gain)-frequency response by the magnitude of the inertial mass displacement from the equilibrium state under a specified acceleration level applied to the acceleration sensor. Therefore the range of the magnetic fluid thickness change is being measured relatively to each of the magnetic field sources, which is in turn determines the range of reactance change on the coil. Thus the adjustment of change in the amplitude of the alternating component on the outputs of the acceleration sensor takes place.

In order to match the dynamic range changes in output voltage of the acceleration sensor to the fixed range of the ADC microcontroller in the signal converter assembly, it may be necessary to serially connect a six channel AC amplifier on the inputs of the ADC microcontroller. Such an amplifier may be designed as an active filter. In order to reduce precision machining requirements to the assemblies and parts of the acceleration sensor and to provide for adjustable amplifier channels in ADC, actual voltages on the acceleration sensor in the stationary state may be recorded into controller after being converted into the digital state by the ADC.

Input data from the device to the computer may occur according to the following example: when the switch indicating operator activity is engaged, and movement of the device by the operator's hand caused acceleration along the X-axis, the inertial body will move to the left from the equilibrium position and the thickness of the magnetic fluid under the left coil will decrease and increase under the right coil.

As a result of the affected volume changes, both Q-factor and alternating current voltage of the right coil will decrease. Based on measurements of the AC change in the X-axis coils, acceleration can be quantified. Signals from the acceleration sensor, after being digitized by the ADC directed to the controller, where X axis acceleration is estimated as follows:

$$a_x = p \times [(U_{x1} - U_{x1}^0) - (U_{x2} - U_{x2}^0)]$$ (Formula 1)

In Formula 1, p is a factor determined by the geometric dimensions of the acceleration sensor and the magnetic fluid properties under a constant magnitude of the magnetic field DC component in the magnetic fluid.

$U_{xi}$ is the momentary magnitude of the AC component on the "i" number of output terminal of acceleration sensor, which corresponds to the X axis; and $U_{x1}^0$ is the amplitude of the AC component on the "i" number of output terminals of the acceleration sensor, which corresponds to the X-axis in the stationary state of the device.

Acceleration components $a_y$ and $a_z$, which correspond to the Y and Z-axis are determined in the manner consistent with Formula 1.

In Formula 1, P is factor determined by the geometric dimensions of the acceleration sensor (1) and the magnetic fluid properties (3) under a constant magnitude of the magnetic field DC component in the magnetic fluid (3);

$U_{yi}$ is the momentary amplitude of the AC component on the "i" number of output terminals of the acceleration sensor (1), which corresponds to the Y axis; and $U_{yi}^0$ is the amplitude of the AC component on the "i" number of output terminals of the acceleration sensor (1), which corresponds to the Y-axis in the stationary state of the device.

Angular acceleration $\psi_x$, which describes the rotation around the Y-axis, is determined by Formula 2:

$$\psi_x = P \times [(U_{y1} - U_{y1}^0) + (U_{y2} - U_{y2}^0)]$$ (Formula 2)

$\psi_y$, $\psi_z$ are determined in a similar manner.

Because relationship $\psi(U_{y1}, U_{y1}^0, U_{y2}, U_{y2}^0)$ has cyclical properties with a cycle of 180°, unambiguous solutions of the rotational angles around X and Y-axis are possible only where the condition $-90° < \psi < 90°$ is satisfied. In the event that rotational angle of acceleration sensor exceeds 180°, in order to resolve the angle unambiguously, it is necessary to calculate the number of completed extrema in the $\psi(U_{y1}, U_{y1}^0, U_{y2}, U_{y2}^0)$ relationship. This can be accomplished in the firmware of the device or in the host computer as it receives the coordinate information.

All three components of linear acceleration together with the three components of angular acceleration of the acceleration sensor described by Formula 1 and 2 are packetized and transferred to the host computer. The real time sampling is related to the motion speed that is to be sampled. This sampling and reporting can occur at very high rates typically in the 0.5-10 millisecond range and if necessary, even faster sampling is achievable. The packets are processed according to the specific software application package running on the computer platform.

As another example and further explanation, a 90° Y-axis rotation of the acceleration sensor is now modeled, given that the acceleration sensor is a sealed container with radius of "2r" and the inertial body is a round sphere with radius "r". Assume also that the equilibrium point of the Z-axis vertical offset between geometric center of the inertial body and the same of the sealed container equals "½ r". Additional assumption is that P power of the alternating magnetic field of each inductance coil, dissipated in the magnetic fluid is proportional to the distance from the inner wall of the sealed container to the surface of the inertial body. Measurement is now done relative to the axis of each coil, i.e., $Pi = K \cdot 1_i$.

In the case when a coil's Q-factor magnitude is determined primarily by the properties and quantity of the magnetic fluid, it can be stated that $Pi = k \times i_i^2 \times Ri$; where $i_i$ is the alternated current component force on each coil, Ri is effective resistance of the coil bridging equivalent, determined by the magnetic fluid. In the event that the alternated current component forces on each coil are equal, then $1_1/1_2 = R_1/R_2$, or according to Rowland's law $1_1/1_2 = U_1/U_2$, where $U_i$ is alternated current voltage component magnitude.

Now consider two positions of the accelerator sensor:
1) X-axis is horizontal, Z-axis is vertical, and
2) A second position due to rotation around the Y-axis of 90°, resulting in the X-axis becoming vertical compared to the first position.

For coils placed on the X-axis it is apparent that in the first position (1), distances from each coil to the inertial body are:

$$L_1 = L_2 = 2r - \frac{\sqrt{(3)}\,r}{2} = r \times (4 - \sqrt{3}\,r)/2$$

In the second case (2), $L_1=r/2$, $L_2=3r/2$.

In case (1), amplitudes of the alternating voltage components on the coils are:

$$U_1 = U_2 = k \times i \times L_1 = k \times i \times r \times (4-\sqrt{3}r)/2 = U_0$$

And for the second case (2):

$$U_1 = k \times i \times r/2, U_2 = 3 \times k \times i \times r/2$$

In order to quantify the acceleration sensor rotation angle, it is calculated as:

$\Delta U = U_1 - U_2$, therefore for the first case (1) $\Delta U = 0$, and in the second case (2) $\Delta U = k \times i \times r$ Consequently, when the acceleration sensor is rotated 90° around the Y-axis, change of $\Delta U$ from 0 to $\pm k \times i \times r$ (where negative or positive result would indicate the rotational direction).

Additionally, the signal amplitude change on each coil (compared to the zero rotation angle of the sensor) is calculated as:

$$\Delta U/U_0 = 2 \times (k \times i \times r)/(k \times i \times r)/(4-\sqrt{3})$$

or about 88% or the original signal level. Thus this determination provides high sensitivity of the present invention in determining rotational angles of the acceleration sensor on the X and Y-axis.

Additionally, when the sensor is rotated, differences in a sum of changing signals of voltage components on the axis around which the acceleration occurs is proportionate to the rotational angle. In the case of lateral movement of the sensor, the difference in alternating current components is proportional to the acceleration. This allows for separation of rotational and displacement signals, which facilitates registration and calculation of angular degrees of freedom to be transferred to the computer.

The example above illustrates that this method allows for independent detection of movement along three spatial degrees of freedom and rotation around three axes producing data about six independent degrees of freedom. The use of the coil's Q-factor for measurement of inertial body displacement ensures good precision and sensitivity. This method can also be used to input three dimensional coordinates, or graphical, alphanumeric information or commands.

Linear $a=\{a_x, a_y, a_z\}$ and angular $\psi=\{\psi_x, \psi_y, \psi_z\}$ acceleration components are calculated by the formulae 1 and 2, after collecting the information from every channel of the ADC that are occurring according to the instructions contained in the ROM of the signal converter assembly, where temporary data and results of the calculations are contained in the RAM of the microcontroller which is a part of the controller.

Sufficient size of the ROM and RAM, which facilitates the programming task of formula 1 and 2, supplements the microprocessor core HC05 used for mathematical calculations and process control. Real time calculation of acceleration is handled by the controller with equal time slices, which are determined with a built-in multifunctional timer.

Calculated components of linear and angular acceleration along with the data describing the state of the switches (e.g., logical 0 may be assigned to the engaged state and logical 1 may be assigned to the disengaged switch state), are joined in the packet by the controller which is transferred to the input of the serial interface (which is a feature in the microprocessor hardware). The microprocessor converts the parallel binary code into serial together with synchronization instructions, error detection and correction, and other associated data.

From the output of the serial interface, the data packet arrives to the input of the level converter, where logical 5V signals are converted according to the serial interface specifications. Through the connection cable, this information is transferred to the computer where the software driver interprets the data according to the application requirements. For example, the software package on the computer may use the devices information to control the object's position in three dimensional space where the object is moved only when the button (one of the six switches) is engaged, including the button which signals operators action, When operator presses any of the other buttons, objects may be selected, a pop-up menu may appear, etc. The total number of control switches may be up to $5-(n \leq 5)$ in this example.

When additional ADC channels are required, they may be obtained by either multiplexing the existing ADC channels or by connecting additional ADC chips to a signal converter assembly with their digital outputs connected to the controller by a bidirectional bus.

In this way the proposed device allows for independent manipulation of six independent dimensional degrees of freedom represented by three linear $a=\{a_x, a_y, a_z\}$ and three angular acceleration components $\psi=\{\psi_x, \psi_y, \psi_z\}$. Based on the information supplied by the device software driver, the computer is able to calculate movement and absolute coordinates (linear as well as angular) in 3D space.

Figure 2:
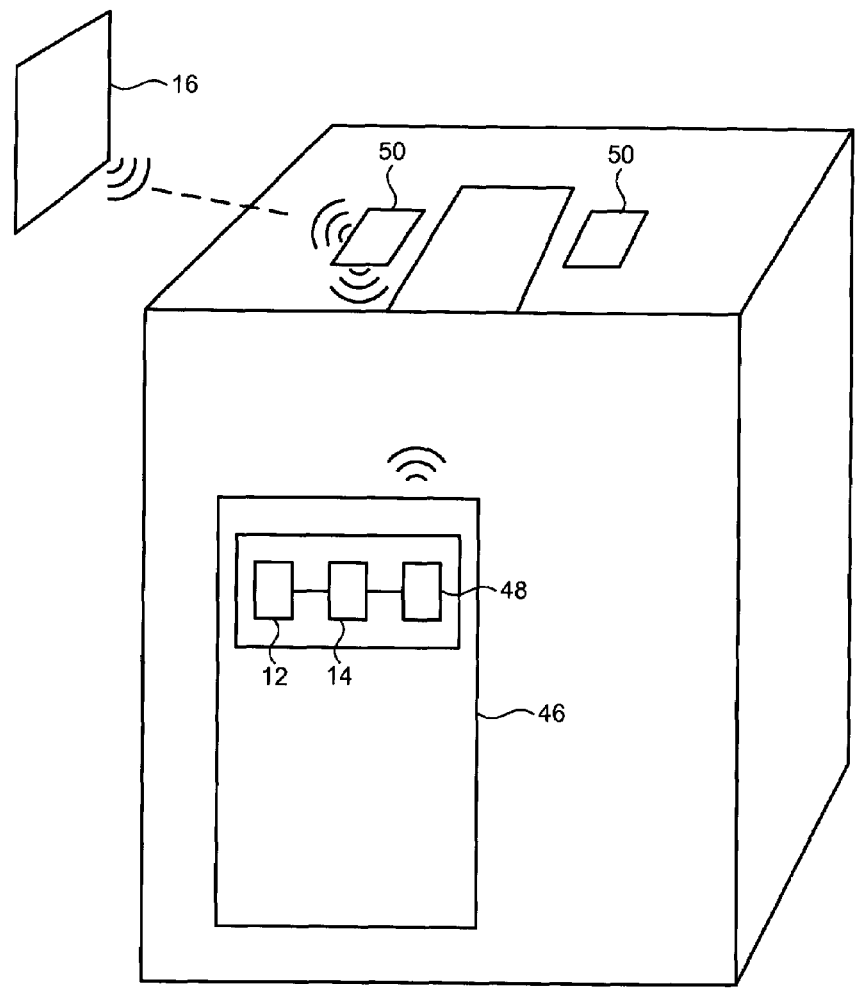
FIG. 2 is a diagrammatic view of a location positioning device in accordance with another embodiment.

An embodiment of the location tracking device may be useful for tracking the location of inventory or other assets. For example, an embodiment of the location tracking device may be used for monitoring and tracking the location of an object within a warehouse or building. With reference to FIG. 2 there is shown a location tracking device configured for tracking the movement or location of an object within a defined space such as a building, warehouse or series of buildings. The acceleration sensor 12 and signal converter module 14 is located on the object 46. A transmitter 48 is located on the object 46 and is in communication with the signal converter module 14. The transmitter 48 relays positional information generated by the acceleration sensor 12 and signal converter module 14 to a receiver 50. In some embodiments the transmitter 48 and receiver 50 communicate through wireless communication, such as for example radio waves, or other wireless communication known to those in the art. The receiver 50 transfers the positional information to the location position device 16, where the position or movement of the object 46 is recorded and monitored. The receiver 50 may be in wireless communication with the location positioning device 16.

By way of an example, a room of a building may contain a receiver 50 near the entry to the room such that when the object enters the room, the transmitter 48 sends a signal to the receiver, which in turn get communicated to the location positioning device 16 indicating that the object has entered the room. At that point, the transmitter 48 also transmits positional information to the receiver 50 as the object is moved to various locations in the room. This positional information may be compared with reference location information to provide the location of the object. For example, the reference location information may be the layout for a storage room having a variety of shelves and cabinets, where the position of the shelves and cabinets are known. The positional information when compared with the reference location information may provide the shelf or cabinet where the object is located.

More than one room or location may be provided with a receiver 50 that is in communication with a location positioning device 16. Where more than one receiver 50 is used, each receiver may be connected to the location positioning device 16 either by a communication cable or by wireless connectivity. While an embodiment was described with respect to rooms in a building, the invention may apply to any area or areas, indoor or outdoors where the location of objects needs to be tracked. Objects may include virtually any asset including, but not limited to, inventories, collections, vehicles, people, animals, and the like.

Figure 3:
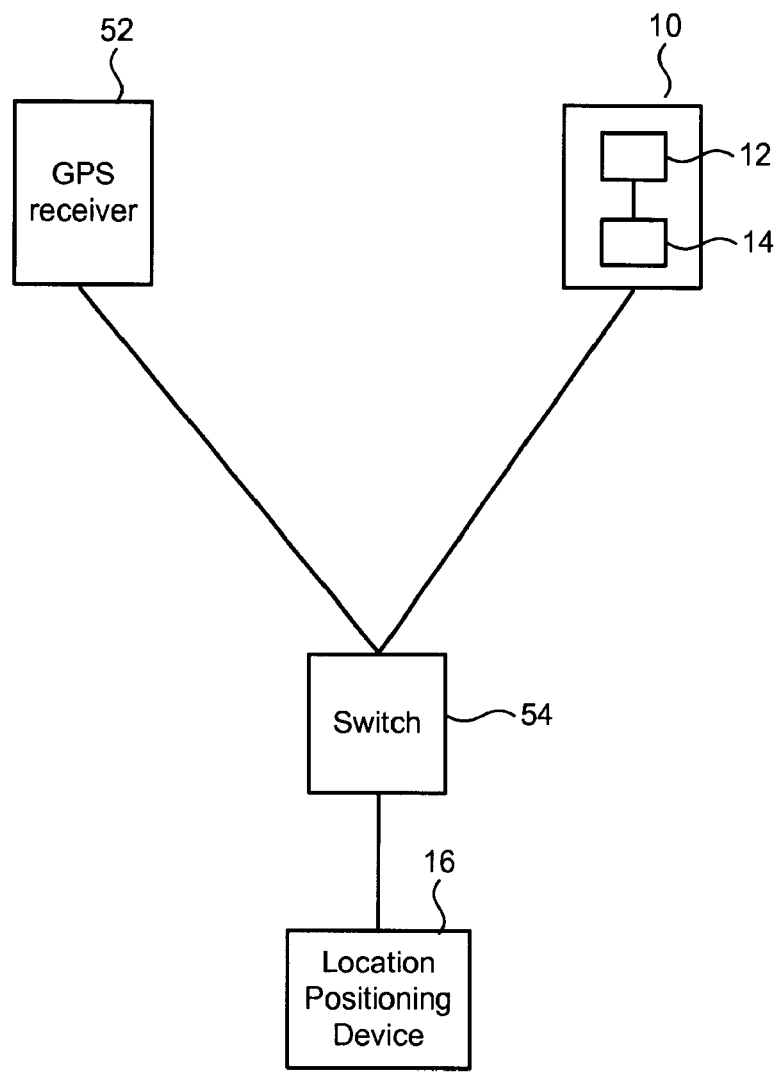
FIG. 3 is a diagrammatic view of a location positioning device in accordance with yet another embodiment.

Another embodiment of the location tracking device includes a GPS system and is illustrated in FIG. 3. In an embodiment of the invention, the location tracking device includes a GPS system 52, an acceleration sensor 12 and signal converter module 14, and a location positioning device 16. The GPS system 52 gathers positional information and provides the information to the location positioning device 16 where the location of the object is determined by conventional GPS technology. The location tracking device includes a switch 54 connected to the signal converter module 14 and the GPS system 52. The switch 54 monitors positional information or signals from the GPS system 52. When the positional information or signal from the GPS is interrupted, the switch 54 gathers positional information from the signal converter module that is being generated by the acceleration sensor 12. This information is communicated to the location positioning device 16 for continued monitoring of the object's location in the event the GPS system fails to provide positional information to the location positioning device.

In yet another embodiment of the invention, a location tracking device 10 with a transmitter 48 may be provided in a mobile device such as a mobile phone, watch, collar, or other similar item to transmit positional information to a remote location. Upon transmitting this information using a wireless transmission, the remote location may use this information to determine the location of the object. The transmitter 48 may include a mobile phone where the positional information may be transmitted to a receiving phone number that is connected to a location positioning device to determine the location of the object or person carrying the object.

What is claimed is:

1. A location tracking device comprising:
   an acceleration sensor, wherein the acceleration sensor comprises:
      a vessel containing magnetic fluid,
      an inertial body in the vessel, and
      a plurality of magnetic field sources located in pairs on mutually perpendicular axes around the vessel, and wherein said magnetic field sources have an output;
   a signal converter module receiving the output of said magnetic field sources; and
   a location positioning device receiving an output of the signal converter module and providing a location measurement of the location tracking device.

2. The location tracking device of claim 1 wherein each magnetic field source comprises inductor coils serially connected to a current generator, wherein an output of the current generator is the output for the magnetic field sources.

3. The location tracking device of claim 1 wherein additional magnetic field sources are introduced into a proximity of the magnetic field sources.

4. The location tracking device of claim 1 wherein said magnetic field sources include one or more constant magnets.

5. The location tracking device of claim 1 wherein the location positioning device comprises a computer in communication with the signal converter module and a display in communication with the computer, wherein the display is adapted to display the location measurement information of the location tracking device.

6. The location tracking device of claim 5 further comprising a transmitter in communication with the signal converter module and a receiver in communication with the location positioning device, wherein the transmitter and receiver are connected for transmitting the location measurement information of the location tracking device by a wireless connection.

7. A location tracking device comprising:
   a Global Positioning System (GPS) receiver;
   an acceleration sensor, wherein the acceleration sensor comprises:
      a closed-vessel containing magnetic fluid,
      an inertial body in the vessel,
      a plurality of magnetic field sources located in pairs on mutually perpendicular axes around the vessel, and wherein said magnetic field sources have an output;
   a signal converter module wherein the output of said magnetic field sources is connected to an input of the signal converter module;
   a location positioning device; and
   a switch in communication with the GPS receiver, the signal converter module, and the location positioning device, wherein the switch provides GPS positional information to the location positioning device and monitors GPS signals from the GPS receiver and based on an interruption of the GPS signal provides location measurement information of the location tracking device from the signal converter module to the location positioning device.

8. The location tracking device of claim 7 wherein each magnetic field source comprises inductor coils serially connected to a current generator, wherein an output of the current generator is the output for the magnetic field sources.

9. The location tracking device of claim 7 wherein additional magnetic field sources are introduced into a proximity of the magnetic field sources.

10. The location tracking device of claim 7 wherein said magnetic field sources include one or more constant magnets.

11. The location tracking device of claim 7 wherein the location positioning device comprises a computer in communication with the signal converter module and a display in communication with the computer, wherein the display is adapted to display the location measurement information of the location tracking device.

12. A location tracking device comprising:
   an acceleration sensor that includes an inertial body in a magnetic fluid and a plurality of magnets generating a magnetic field in the magnetic fluid;
   a signal converter receiving a signal that represents a displacement of the inertial body and outputting an acceleration measurement; and
   a location positioning device receiving the acceleration measurement and calculating a location of the location tracking device based on the acceleration measurement.

13. The location tracking device of claim 12, wherein each magnet comprises an inductor coil serially connected to a current generator, wherein the inductor coils provide the signal.

14. The location tracking device of claim 12, wherein each magnet comprises a permanent magnet.

15. The location tracking device of claim 12, wherein each magnet comprises an electromagnet.

16. The location tracking device of claim 12, wherein each magnet comprises an electromagnet and a permanent magnet.

17. The location tracking device of claim 12, wherein the location positioning device comprises a computer in communication with the signal converter and a display in communication with the computer, wherein the display is adapted to display the location measurement information of the location tracking device.

18. The location tracking device of claim 17, further comprising a transmitter in communication with the signal converter and a receiver in communication with the location positioning device, wherein the transmitter and receiver are connected using a wireless connection.

19. A location tracking device comprising:

a Global Positioning System (GPS) receiver;

an accelerometer that includes an inertial body in a magnetic fluid and a plurality of magnets generating a magnetic field in the magnetic fluid;

a signal converter outputting a signal representative of acceleration of the inertial body; and a location positioning device connected to the GPS receiver and to the signal converter, wherein, upon an interruption of a signal from the GPS receiver, the location positioning device calculates location of the location tracking device based on the signal representative of the acceleration.

* * * * *